United States Patent [19]

Kondo et al.

[11] Patent Number: 5,233,422
[45] Date of Patent: Aug. 3, 1993

[54] APPARATUS FOR SELECTIVELY ENLARGING OR REDUCING AN AREA OF A REPRODUCED TELEVISION PICTURE

[75] Inventors: Tetsujiro Kondo, Tokyo; Yasuhiro Fujimori; Hideo Nakaya, both of Kanagawa, all of Japan

[73] Assignee: Sony Corporation, Tokyo, Japan

[21] Appl. No.: 780,091

[22] Filed: Oct. 22, 1991

[30] Foreign Application Priority Data

Oct. 26, 1990 [JP] Japan .................................. 2-290161

[51] Int. Cl.[5] ........................................... H04N 3/223
[52] U.S. Cl. .................................. 358/180; 358/140; 358/11; 358/194.1; 358/183
[58] Field of Search ............... 358/180, 11, 140, 22, 358/183, 194.1, 188, 230

[56] References Cited

U.S. PATENT DOCUMENTS

| | | | |
|---|---|---|---|
| 4,528,585 | 7/1985 | Bolger | 358/180 |
| 5,029,326 | 7/1991 | Tabata | 358/140 |

FOREIGN PATENT DOCUMENTS 0343539 11/1989 European Pat. Off. .
2121571 5/1990 Japan .

OTHER PUBLICATIONS

SMPTE Journal, vol. 99, No. 2, Feb. 1990, pp. 124–135, White plains, N.Y., US; L. Thorpe et al.: "An HDTV downconverter for post-production" p. 132, right--hand column, line 18–page 133, middle–column, line 33; figure 16.

*Primary Examiner*—Victor R. Kostak
*Assistant Examiner*—Sherrie Hsia
*Attorney, Agent, or Firm*—Alvin Sinderbrand; William S. Frommer

[57] ABSTRACT

A television signal receiving apparatus for receiving a high definition television signal comprises, a receiving circuit for receiving the high definition television signal and for generating a high definition video signal, a converting circuit for converting the high definition video signal into a standard definition video signal, a display device supplied with the standard definition video signal and for displaying the reproduced picture according to the standard definition video signal, and a control device including a selecting device for selecting a predetermined area of the reproduced picture and a processing circuit for processing the high definition video signal corresponding to the selected area so that the reproduced picture corresponding to the selected area is changed in size.

4 Claims, 2 Drawing Sheets

APPARATUS FOR SELECTIVELY ENLARGING OR REDUCING AN AREA OF A REPRODUCED TELEVISION PICTURE

BACKGROUND OF THE INVENTION

1. Field of the Invention

The invention relates to a television receiving apparatus capable of receiving a high definition television signal, displaying a reception picture on the existing television apparatus and enlarging a desired part of the reception signal for display.

2. Description of the Prior Art

A television receiving apparatus, which is capable of converting a high definition television signal, for example a HDTV signal, into a MUSE signal for transmission and receiving the MUSE signal, has been proposed and is being put into practical use. However, large display television receivers, which decode the MUSE signal and have a CRT of (9:16) aspect ratio, are slow coming into widespread use, since they are expensive. It is predicted that such receivers will be used for demonstration for the moment and that high definition software will be down-converted to allow it to be seen on television receiving apparatus of the existing system.

However, even a MUSE signal is a kind of high definition television signal and contains a large amount of information. As a result, when reproduction is to be made by the existing television receiver, it is desirable that the large quantity of information be effectively utilized, in addition to performing down-conversion.

OBJECTS AND SUMMARY OF THE INVENTION

An object of the invention is, therefore, to provide a television receiving apparatus capable of providing an enlarged picture of good quality in a desired area using information of a high definition television signal when the high definition television signal is received at the existing apparatus.

According to an aspect of the invention there is provided a television signal receiving apparatus for receiving a high definition television signal, comprising a receiving circuit for receiving the high definition television signal and for generating a high definition video signal, a converting circuit for converting the high definition video signal into a standard definition video signal, a display device supplied with the standard definition video signal and for displaying the reproduced picture according to the standard definition video signal, and a control device including a selecting device for selecting a predetermined area of the reproduced picture and a processing circuit for processing the high definition video signal corresponding to the selected area so that the picture corresponding to the selected area is changed in size.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
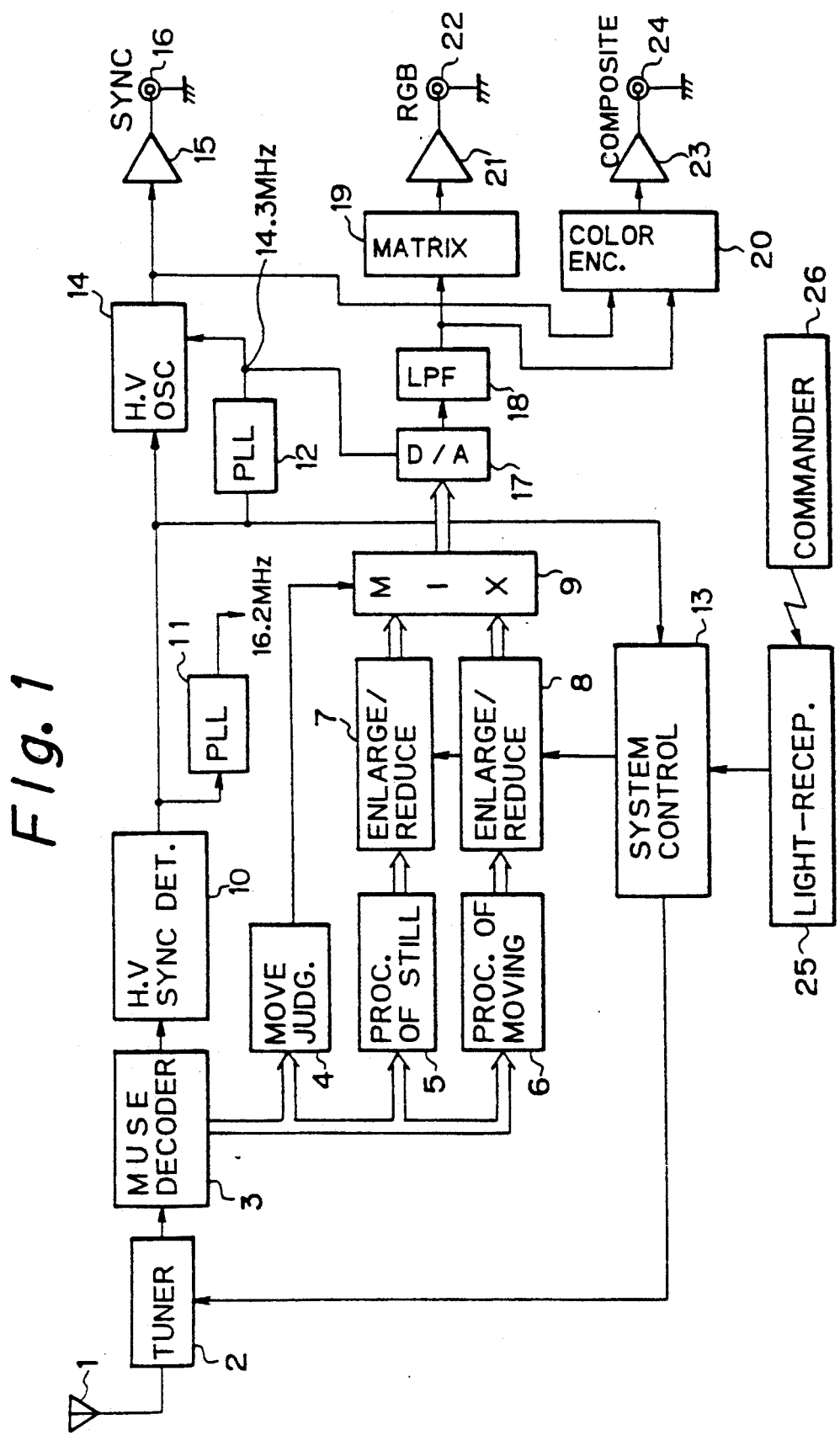
FIG. 1 is a block diagram of one embodiment of this invention.

An embodiment of this invention will be described referring to the drawings hereunder. FIG. 1 shows, the system architecture. 1 is an antenna for BS reception, 2 is a BS tuner, and 3 is a MUSE decoder. Also, a TCI decoder is provided at the MUSE decoder, and a Y (luminance) signal, a (R-Y) signal and a (B-Y) signal are produced in parallel from the MUSE decoder 3.

The output signal of the MUSE decoder 3 is fed to a movement judgement circuit 4, a still picture processing circuit 5 and a moving picture processing circuit 6. The movement judgement circuit 4, still picture processing circuit 5 and moving picture processing circuit 6 are often included as a part of the MUSE decoder 3. In this embodiment, enlargement and reduction circuits 7 and 8 are connected to the still picture processing circuit 5 and the moving picture processing circuit 6 respectively. The outputs of the enlargement and reduction circuits 7 and 8 are supplied to a mixer 9. The mixer 9 receives the judgement output signal of the movement judgement circuit 4 so that the mixture ratio of a still picture signal and a moving picture signal is controlled.

A synchronization detection circuit 10 is provided in association with the MUSE decoder 3. A horizontal synchronization signal and a frame pulse are supplied to a PLL 11 and a PLL 12, a system control circuit 13 and a synchronization oscillation circuit 14. The PLL 11 generates a clock signal of 16.2 MHz in synchronism with the synchronization signal, while the PLL 12 generates a clock signal of 14.3 MHz in synchronism with the synchronization signal.

In the signal processing done up to the abovementioned mixer 9, the clock signal of 16.2 MHz generated at the PLL 11 is used. Further, in the processing of a signal produced from the mixer 9, the clock signal of 14.3 MHz from the PLL 12 is employed. In response to the synchronization signal from the synchronization detection circuit 10 and the clock signal from the PLL 12, the synchronization oscillation circuit 14 generates a synchronization signal necessary for a standard monitor (i.e., an existing monitor). This synchronization signal is taken out at an output terminal 16 through an amplifier 15.

A digital component signal from the mixer 9 is given to a D/A converter 17 and converted into an analog component signal. The output signal of the D/A converter 17 is supplied to a matrix circuit 19 and a color encoder 20 through a low-pass filter 18, respectively. The Y, (R-Y) and (B-Y) signals are converted by the matrix circuit 19 into three primary colors signals of R, G, B. The three primary colors signals are taken out at an output terminal 22 through an amplifier 21. A synchronization signal from the synchronization oscillation circuit 14 is supplied to the color encoder 20 to form a composite color video signal. The composite color video signal is taken out at an output terminal 24 through an amplifier 23.

These three primary color signals or composite color video signal have an aspect ratio of (9:16) and provide 1125 horizontal scanning lines. Although not shown, an existing color monitor of the standard system or of the aspect ratio of (4:3) is connected to the output terminal 22 or 24 through the down-converter. Further, a synchronization signal from an output terminal 16 is supplied to the color monitor. Therefore, a picture corresponding to a MUSE signal received at the standard color monitor can be reproduced. As one example, predetermined upper and lower groups of, for example, 50 lines each out of the 525 horizontal scanning lines are provided as black belts 27A and 27B as shown in FIG. 2A so that a picture 28 of (16:9) aspect ratio is reproduced.

The above-mentioned system control circuit 13 is provided to control the whole operation of the television receiving apparatus. In other words, the circuit 13 generates control signals necessary for normal reception of channel selection control signals, etc. to the tuner 2 and control signals for the enlargement and reduction circuits 7 and 8. These control signals are a control signal for designating an area to be enlarged or reduced, and the desired degree of magnification. A remote control signal (an infrared signal) generated by the operation of the remote control unit 26 is given to a light-reception unit 25 of the system control circuit 13.

Figure 3:
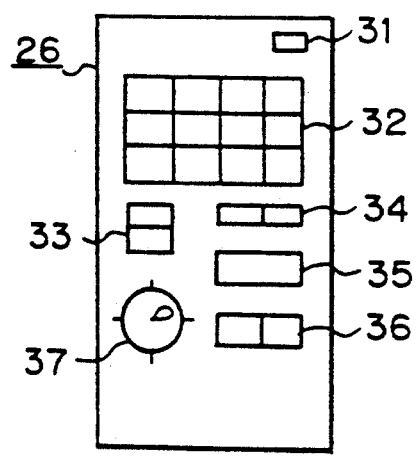
FIG. 3 is a schematic diagram showing an arrangement of switches on a remote control unit.

FIG. 3 shows one example of the remote control unit 26. 31 is a switch for power control, 32 is a switch for channel selection, 33 is a switch for volume increase or decrease, 34 is an up/down switch for channel, 35 is a switch for establishing a default condition, 36 is an up/down switch for magnification change, and 37 is a joy stick.

Figure 2A:
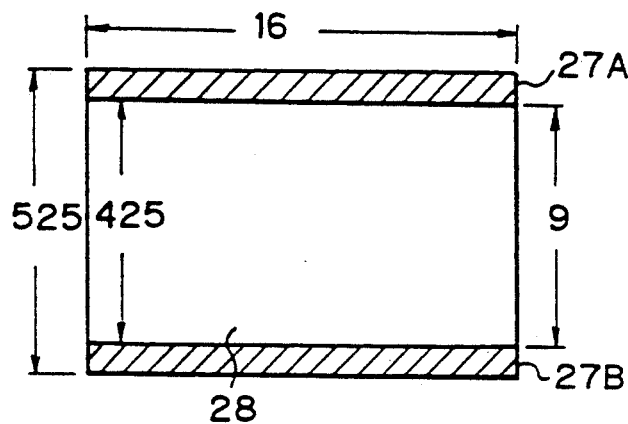
FIGS. 2A and 2B are schematic diagrams showing a display picture of a monitor.
Figure 2B:
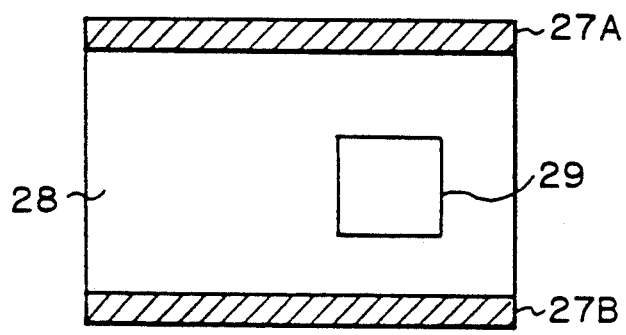

The above-stated picture 28 shown in FIG. 2A is displayed on the monitor in accordance with a default condition when the switch 35 is pressed. In response to the movement of a joy stick 37 in the remote control unit 26, control returns to the default condition, and a cursor 29 of a rectangular frame in the picture 28 is displayed as shown in FIG. 2B. The cursor 29 indicates an area to be the object of enlargement or reduction. The cursor 29 is movable within the picture 28 corresponding to the operation of the joy stick 37. With this, a user can arbitrarily select the area of picture 28 where enlargement or reduction is to occur, which comprises the picture 28.

The display of the cursor 29 goes off one second, for example, after the operation of the joy stick 37 is stopped. Simultaneously, a displayed picture is switched to an enlarged picture. The enlarged picture is developed by the enlargement of the area corresponding to the above-mentioned cursor 29. The degree of enlargement and reduction can be designated arbitrarily by operating the up/down switch 36 for alternating magnification. When the up button of the up/down switch 36, for instance, is kept pressed, the magnification may be increased to infinity When the down button of up/down switch 36 is kept pressed, the magnification is reduced to the default condition, which is a normal picture display, i.e. without magnification.

The enlargement or reduction of the picture can be realized by processing a high definition signal by the above-stated enlargement and reduction circuit 7 and 8. The enlargement of this picture can be made by increasing the interval of the picture elements in the horizontal and vertical directions depending on the magnification and inwardly interpolating insufficient picture elements. As mentioned above, a picture of the size equal to that of the picture in the default condition, i.e. normal display, is shown when maximum reduction is selected in this embodiment. As a result, substantially only enlargement processing occurs in this embodiment. Of course, reduction to smaller that the size of the default condition may occur in alternative embodiments.

Normally, in the enlargement processing, the quality of a processed picture is degraded. However, since, in a high definition picture, the number of picture elements in each of the horizontal and vertical directions is about double as compared with the standard system, no degradation of picture quality occurs until the magnification becomes about twice. Also, even in the case of larger magnification, the deterioration of picture quality can be suppressed.

This invention enables a desired area of a displayed picture to be enlarged at arbitrary magnification. In the case of the high definition television signal, since there is a large amount of original information, an enlarged picture of good quality can be viewed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A television signal receiving apparatus comprising:
   receiving means for receiving a high definition television signal and for generating a high definition video signal,
   converting means for converting said high definition video signal into a standard definition video signal,
   display means supplied with said standard definition video signal for displaying a reproduced picture according to said standard definition video signal, and
   control means operable by a user including means for selecting an area of the reproduced picture and a desired degree of enlargement or reduction of the selected area, and processing means for processing said high definition video signal corresponding to said selected area so that the reproduced picture corresponding to said selected area is changed in size according to the desire degree of enlargement or reduction.

2. A television signal receiving apparatus according to claim 1, wherein said control means includes a remote control unit for generating a control signal that designates said selected area and the desire degree of enlargement or reduction.

3. A television signal receiving apparatus according to claim 1, wherein, in the absence of a selected desired degree of enlargement or reduction, said selected area has a normal size and wherein said control means includes switching means for establishing a default condition wherein said selected area is displayed at said normal size.

4. A television signal receiving apparatus according to claim 1, wherein said display means includes means for generating a cursor that indicates said selected area.

* * * * *